(No Model.) 6 Sheets—Sheet 1.
R. A. BRIGHT & W. A. PECK.
CIGAR WRAPPING MACHINE.
No. 453,050. Patented May 26, 1891.
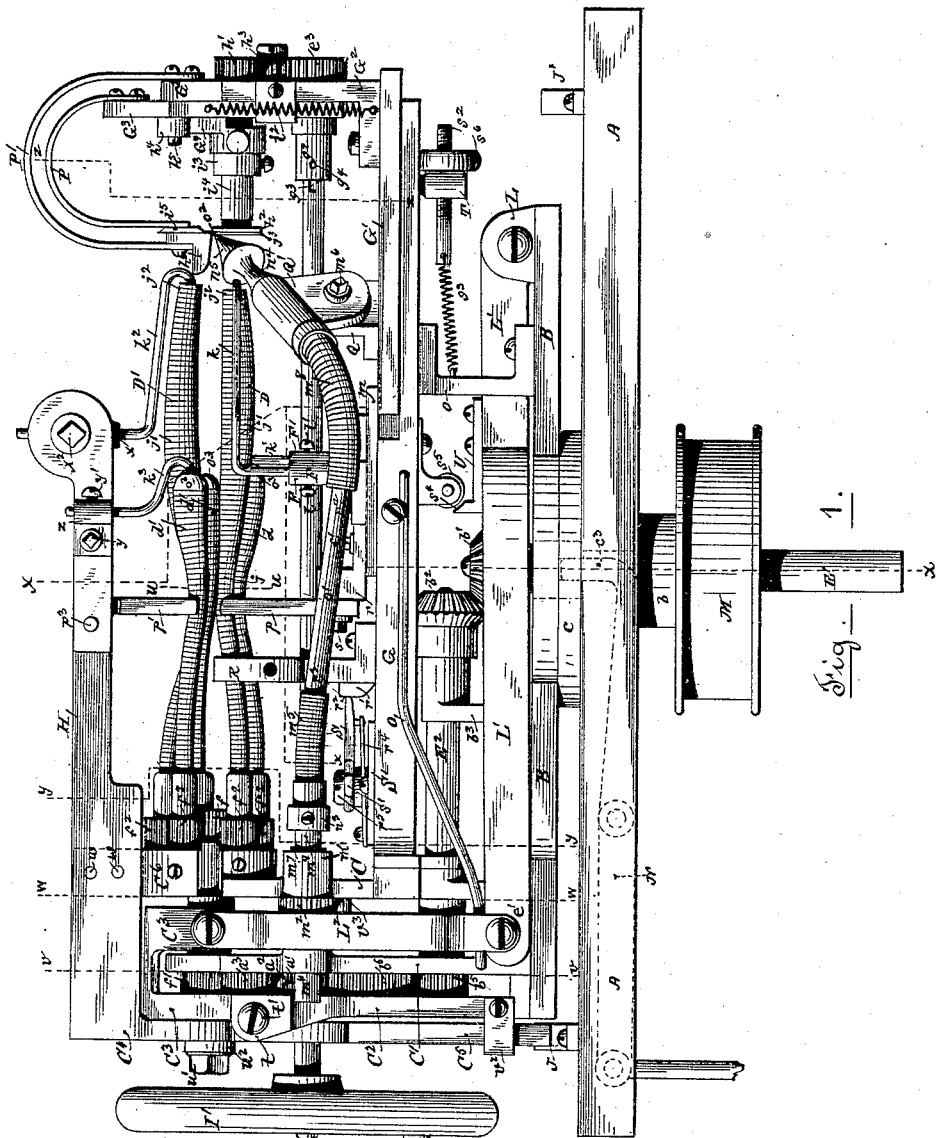
Witnesses
Chas. F. Schmelz
Mark A Heath
Inventors
Richard A. Bright
Walter A. Peck
By their Attorney
S. Scholfield

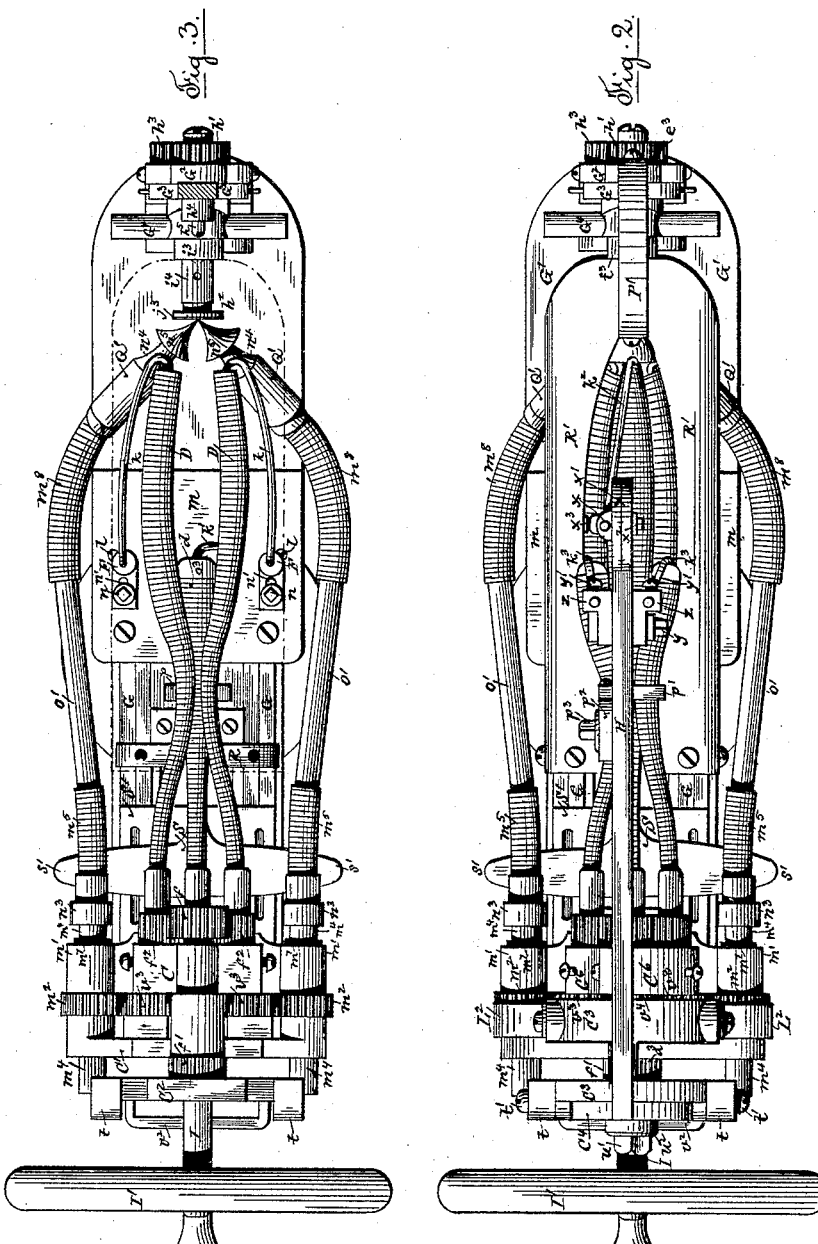

(No Model.) 6 Sheets—Sheet 3.

R. A. BRIGHT & W. A. PECK.
CIGAR WRAPPING MACHINE.

No. 453,050. Patented May 26, 1891.

Witnesses
Chas. F. Schmelz.
Mark A Heath

Inventors
Richard A. Bright
Walter A. Peck
By their Attorney
S. Scholfield (No Model.) 6 Sheets—Sheet 4.
R. A. BRIGHT & W. A. PECK.
CIGAR WRAPPING MACHINE.
No. 453,050. Patented May 26, 1891.
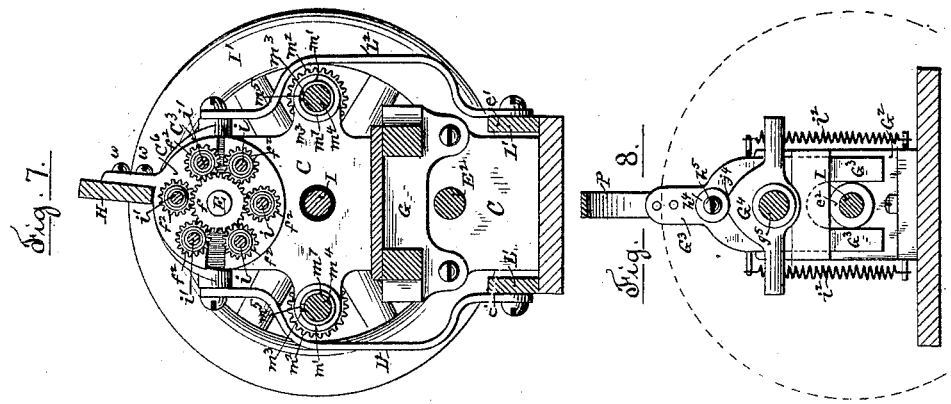
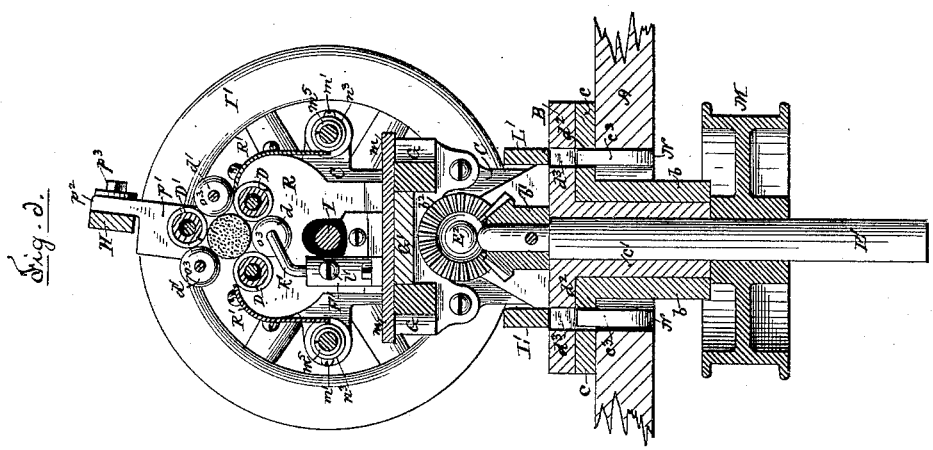
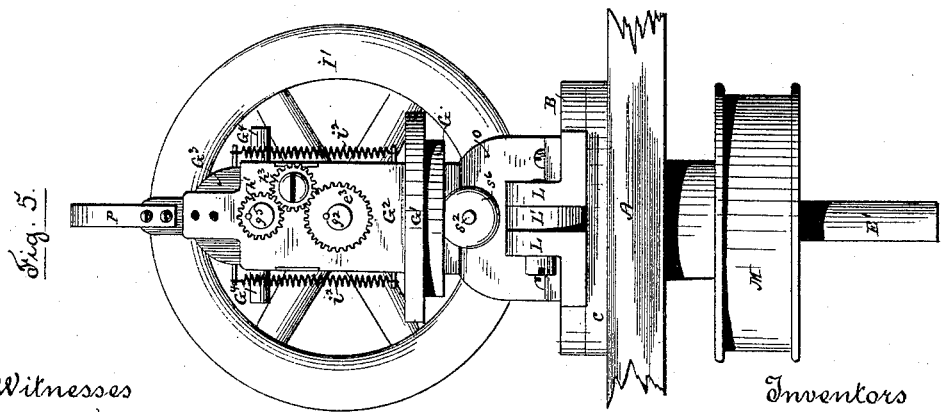
Witnesses
Chas. F. Schmelz.
Mark A. Heath.
Inventors
Richard A. Bright
Walter A. Peck
By their Attorney
S. Scholfield (No Model.) 6 Sheets—Sheet 5.
R. A. BRIGHT & W. A. PECK.
CIGAR WRAPPING MACHINE.
No. 453,050. Patented May 26, 1891.
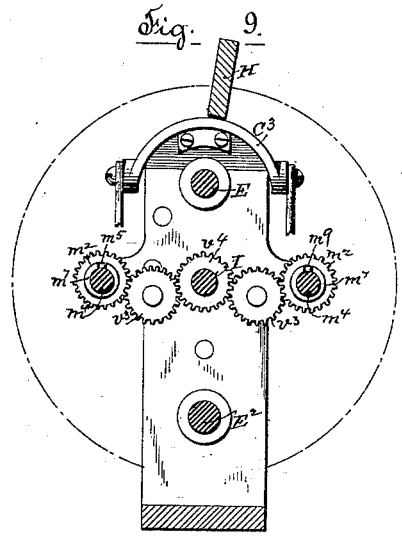
Fig. 9.
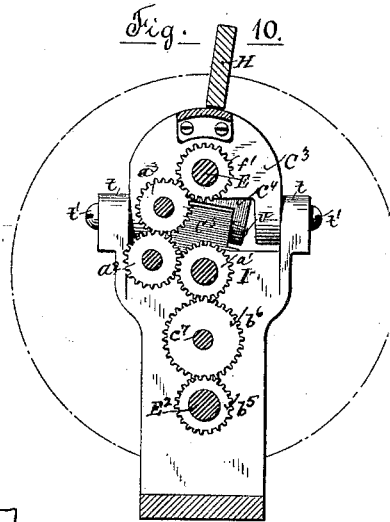
Fig. 10.
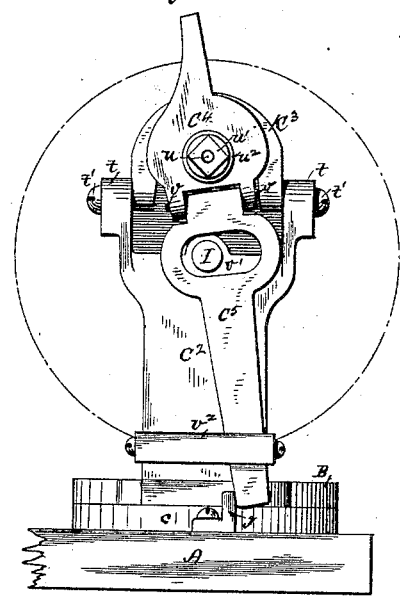
Fig. 11.
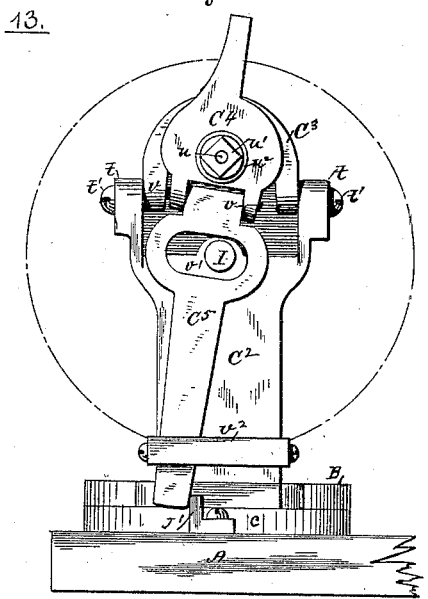
Fig. 12.
Fig. 13.
Witnesses
Chas. F. Schmelz.
Mark A. Heath
Inventors
Richard A. Bright
Walter A. Peck
By their Attorney
S. Scholfield (No Model.) 6 Sheets—Sheet 6.

R. A. BRIGHT & W. A. PECK.
CIGAR WRAPPING MACHINE.

No. 453,050. Patented May 26, 1891.

Witnesses
Chas. F. Schmelz,
Mark A Heath

Inventors
Richard A. Bright
Walter A. Peck
By their Attorney,
S. Scholfield

UNITED STATES PATENT OFFICE.

RICHARD A. BRIGHT AND WALTER A. PECK, OF PROVIDENCE, RHODE ISLAND; SAID BRIGHT ASSIGNOR TO SAID PECK.

CIGAR-WRAPPING MACHINE.

SPECIFICATION forming part of Letters Patent No. 453,050, dated May 26, 1891.

Application filed April 19, 1890. Serial No. 348,693. (No model.)

*To all whom it may concern:*

Be it known that we, RICHARD A. BRIGHT and WALTER A. PECK, citizens of the United States, residing at Providence, in the State of Rhode Island, have invented a new and useful Improvement in Cigar-Wrapping Machines, of which the following is a specification.

Our invention consists in a cigar-wrapping machine provided with a pivot, whereby the machine can be readily turned upon said pivot as an axis, so as to present its opposite sides to the operator, and also in a pivoted support for the opening roll or rolls of the cluster, whereby the opening left between the stationary and movable rolls of the cluster for running in the wrapper can be changed from one side of the machine to the other by means of a lateral swinging movement of the said rolls, which movement can be effected automatically by the turning of the machine upon its pivot-axis.

Our invention also consists in the improved construction and arrangement of the several parts of the wrapping-machine, as hereinafter fully set forth.

Figure 4:
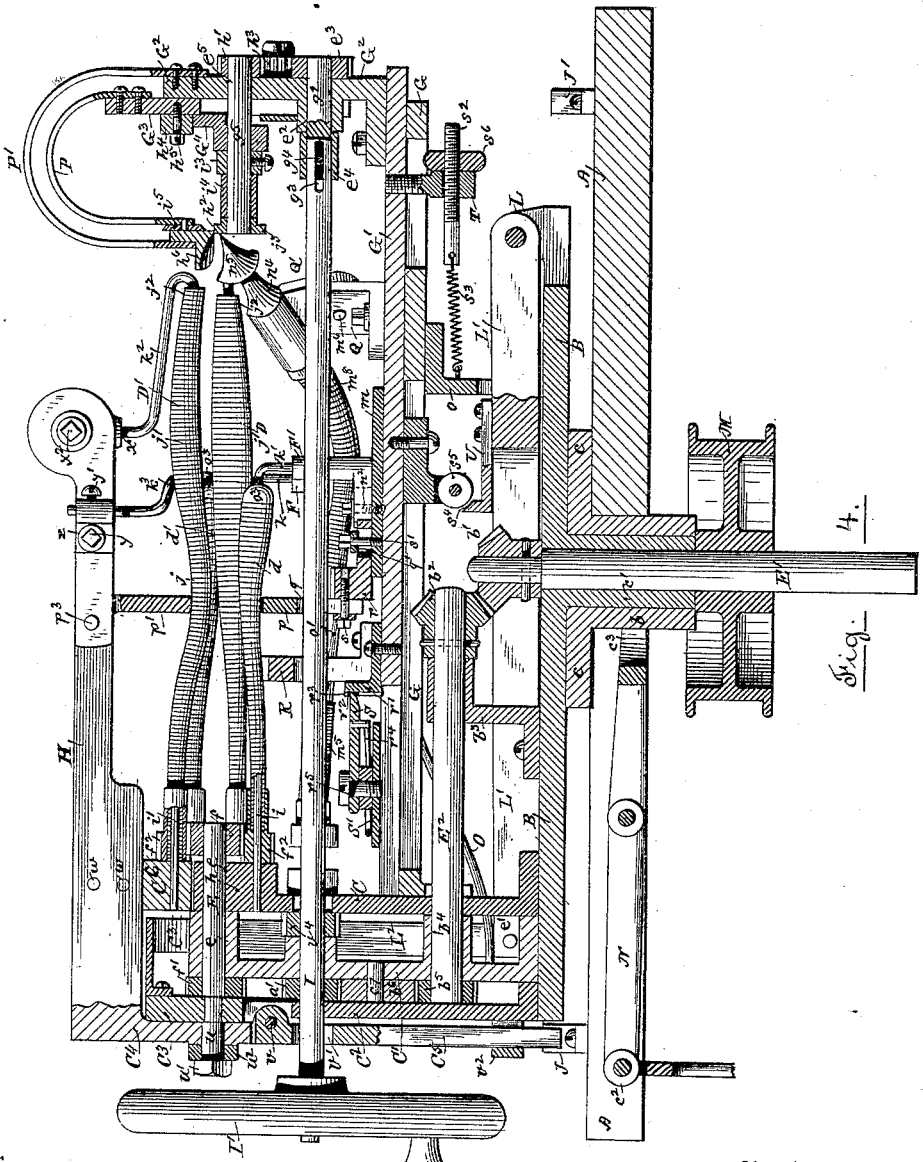
Figure 14:
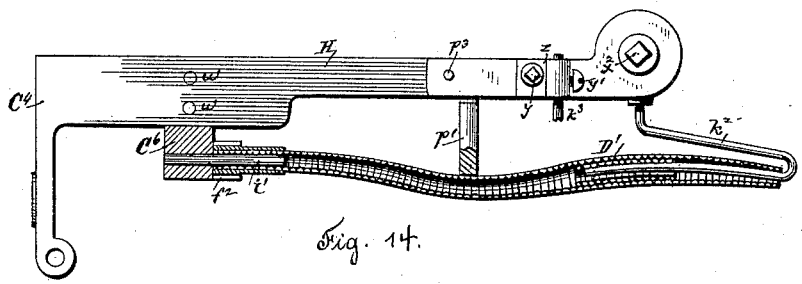
Figure 15:
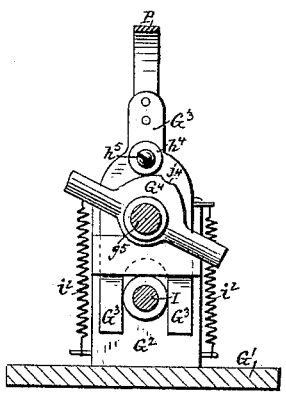
Figure 16:
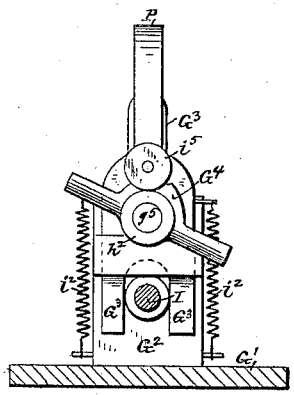

Figure 1 represents a side elevation of our improved cigar-wrapping machine with the ironing-plates removed. Fig. 2 represents a top view of the same with the ironing-plates in position. Fig. 3 represents a top view of the machine with the movable upper jaw and the attached rolls removed and without the ironing-plates. Fig. 4 represents a longitudinal vertical section. Fig. 5 represents a forward end view. Fig. 6 represents a transverse vertical section taken in the line $x\ x$ of Fig. 1. Fig. 7 represents a transverse vertical section taken in the line $y\ y$ of Fig. 1. Fig. 8 represents a vertical section taken in the line $z\ z$ of Fig. 1. Fig. 9 represents a vertical section taken in the line $w\ w$ of Fig. 1. Fig. 10 represents a vertical section taken in the line $v\ v$ of Fig. 1. Figs. 11 and 12 are detail elevations of the rearward portion of the machine, showing the lever for swinging the movable upper rolls of the cluster from side to side. Fig. 13 represents a detail transverse section taken through the rolls in the line $u\ u$ of Fig. 1. Fig. 14 represents a longitudinal section of the movable upper roll of the cluster. Fig. 15 represents a vertical section taken as in Fig. 8, showing the position of the cam-lever when the cutter is in operation. Fig. 16 represents the cutter in contact with the cutting-bed.

In the accompanying drawings, A represents the table upon which the wrapping-machine is supported, the said table being provided with an attached bearing-sleeve $b$, having a flange $c$.

The bed-plate B of the machine is provided with a hollow stem $c'$, which projects downward into the cavity of the bearing-sleeve $b$, and forms a vertical pivot-axis, upon which the machine can be turned from side to side, as required. Upon the rearward portion of the bed-plate B are attached the upright standards C C', which at their upper ends form journal-bearings $e$ for the central shaft E, which at its forward end is provided with the attached gear $f$ and at its rearward end with the attached gear $f'$.

The head $h$ at the upper end of the standard C is provided with perforations adapted to receive and hold several forwardly-projecting fixed pins $i$, which serve to form the rearward bearings for the flexible rolls D D of the cluster and also for the intermediate roll $d$, which latter roll is made shorter than the rolls D D, and serves to prevent the wrapper, when first inserted between the movable upper rolls and the stationary lower rolls of the cluster at either side of the machine, from running out at the space between the rolls D D, the wrapper thus failing to wind upon the cigar-bunch. The flexible rolls D D are each made of a spiral-wire coil which is gradually enlarged from the tuck-rolling portion $j$ to the middle rolling portion $j'$, and then gradually tapered toward the forward end $j^2$ of the roll, and the forward end of each of the rolls D is supported for revolution and adjustment upon a bearing-wire $k$, which enters the hollow of the roll, and is turned backward and downward at the outside of the roll and inserted into the cavity of the hollow standard F, and adjustably held therein by means of the set-screw $l$, the said standard F being adjustably attached to the fixed bed-plate $m$ by means of the set-screw $n$, and the slolt $n'$ made in the attaching base of the standard, as shown in Fig. 3. The bed-plate $m$ is attached to the upper side of the slide-bar G, which at its rearward end is attached to the forward face of the standard C, and is supported at its forward end by means of the standard $o$, which is attached to the pivoted bed-plate B. The flexible rolls D are left without a core from the end of the bearing-pin $i$ to the end of the bearing-wire $k$, as shown in the vertical section of the upper roll D' in Fig. 14, and in order to provide for the proper support and adjustment of the rolls D D at their tuck-rolling portion, which is destitute of a central core, we arrange an adjustable supporting bar or bridge $p$, the upper end of which is cut out to fit the exterior of the rolls D D $d$, thus forming an exterior bearing for the same, the lower end of the bridge $p$ being provided with a slot $q$, and adjustably attached to the bracket $r$ by means of the screws $s$, the said bracket being also adjustably attached to the bed-plate $m$ by means of the slot $q'$ and the screw $s'$. The rolls D D $d$ are each provided at their rearward end with an attached gear $f^2$, which engages with the teeth of the driving-gear $f$ upon the shaft E. The roll $d$ is supported at its forward end by means of the bearing-wire $k'$, which is adjustably held within the cavity of the hollow standard F' by means of the screw $l'$, the said standard F' being also adjustably attached to the fixed bed-plate $m$ by means of the set-screw $n^2$.

At the rear end of the bed-plate B, at the back of the standards C', is attached the standard $C^2$, to the upper end of which is pivoted the head $C^3$ by means of the ears $t\ t$ and the pivot-screws $t'\ t'$, as shown in Figs. 11 and 12, and upon a stud $u$, attached to the head $C^3$ in line with the axis of the shaft E, is pivoted the laterally-swinging head $C^4$, the said head $C^4$ being loosely held upon the pivot-stud $u$ by means of the nut $u'$ and the collar $u^2$. To the swinging head $C^4$ is also pivoted the lever $C^5$ by means of the pivot-pin $v$, the said lever being provided with a slot $v'$, which embraces the hand-operated driving-shaft I, and being held at its lower end for a limited swinging movement in a plane parallel to the plane of the standard $C^2$ by means of the yoke $v^2$; and oppositely upon the table A at equal distances from the pivot-stem $c'$ of the machine are secured the stops J J', which when the machine is turned upon the pivot $c'$ will engage with the lower end of the lever $C^5$ and cause the swinging of the head $C^4$ from side to side upon the pivot-stud $u$. The swinging head $C^4$ is provided with a rigid forwardly-projecting bar H, to which is attached the head $C^6$, which serves to support several forwardly-projecting fixed pins $i'$, the said pins forming the rearward bearing for the rolls D' $d'\ d'$, the head $C^6$ being firmly attached to the bar H by means of the screws $w\ w$. The forward end of the roll D' is supported upon the bearing-wire $k^2$, which enters the hollow of the roll and is turned backward and upward at the outside of the roll and inserted into an opening $x$, made diametrically in the circular plate $x'$, which is attached to the outer end of the bar H by means of the screw $x^2$, the inserted end of the bearing-wire $k^2$ being held adjustably within the opening $x$ by means of the set-screw $x^3$. The bearing-wires $k^3$ for the forward end of the rolls $d'\ d'$ are each turned backward and upward at the outside of the roll, and inserted into an opening made in holding-pieces $z\ z$, attached to the side of the bar H by means of the screw $y$, the said wires $k^3$ being adjustably held in the openings made in the said holding-pieces by means of the screws $y'$.

In order to properly support the tuck-rolling portion of the upper roll D', which is made without a forming-core, between the forward end of the bearing-pin $i'$ and the rearward end of the bearing-wire $k^2$, we provide an adjustable bridge $p'$, having a slotted attaching-ear $p^2$, which is secured to the bar H by means of the screw $p^3$. The lower end of the bridge $p'$ is made to conform to the peripheries of the rolls D' $d'\ d'$, as shown in Fig. 13, thus forming an outside bearing for the said rolls, and the bridge $p'$ is made adjustable both vertically and horizontally upon the bar H.

To an ear L at one end of the bed-plate B is pivoted a forked lever L', from the ends $e'$ of which connection is made to the pivoted head $C^3$ by means of the connecting-rods $L^2$ $L^2$, so that upon the upward movement of the lever L' the head $C^3$ will be turned upon its pivot-screws $t'\ t'$ and the forward end of the bar H and the rolls D' $d'\ d'$ raised, so that a cigar-bunch can be inserted into the cigar-rolling pocket of the machine between the upper and lower rolls of the cluster, the said upper rolls being raised angularly from the said lower rolls in a plane passing through the axis of the cigar-rolling pocket.

The shaft E, which drives the cigar-forming rolls, is rotated from the hand-operated driving-shaft I by means of the gear $a'$ upon the shaft I and the intermediate gears $a^2\ a^3$, the teeth of the said intermediate gear $a^3$ engaging with the gear $f'$ upon the shaft E, so that the shaft E will be made to revolve in a direction opposite to that of the shaft I, and upon the outer end of the shaft I is attached the hand-wheel I'. The shaft E may also be driven by means of an upright shaft E', which extends upward through the cavity of the pivot-stem $c'$, and is provided at its upper end with the bevel-gear $b'$, which engages with the corresponding bevel-gear $b^2$ upon the horizontal shaft $E^2$, the said shaft being supported at its forward end by means of the bearing-standard $b^3$, which is secured to the bed-plate B and at its rearward end by means of a bearing $b^4$, made in the standards C C', and to the rearward end of the shaft $E^2$ is attached the gear $b^5$, which is operatively connected with the gear $a'$ upon the hand-operated shaft I by means of the intermediate gear $b^6$, which is loosely held upon the stud $c^7$, attached to the standard C', and by means of a pulley M upon the shaft E' the machine can be operated by power.

Within a slot made in the table A is pivoted the lever N, from one end $c^2$ of which connection is to be made to a suitable treadle, and the forked opposite end $c^3$ of the lever N is turned upward through suitable openings $d^2$, made through the flange $c$ of the bearing-sleeve $b$, and corresponding holes $d^3$ are made in the bed-plate B at opposite sides of the pivot-stem $c'$, as shown in the transverse section, Fig. 6, so that at whichever side of the machine is turned to the operator a hole through the plate B will be presented in line with the holes through the flange $c$ of the bearing-sleeve, so that the operator of the machine by pressing the treadle downward will cause the elevation of the end $c^3$ of the lever N through the presented holes $d^3$ in the bed-plate B to raise the outer end of the forked lever L', thus causing the separation of the upper rolls from the lower rolls of the cluster. The wire spring O, attached to the opposite edges of the side bar G and bearing upon the outer ends $e'$ of the lever L', serves to carry the lever L' downward to close the rolls upon the reverse movement of the treadle by the operator.

To the slide-bar G is secured the sliding table G', to the forward end of which is attached the upright standard $G^2$, and within the bearing $e^2$ of the standard $G^2$ is placed the short shaft $g^2$, which is provided at its outer end with the gear $e^3$ and at its inner end with the socket-opening $e^4$, the said opening being adapted to receive the forward end of the shaft I, which is provided with a longitudinally-directed slot $g^3$, and the shaft $g^2$ is connected to the shaft I by means of the transverse pin $g^4$, which passes from side to side through the slot $g^3$, so that upon turning the shaft I by means of the hand-wheel a corresponding rotary movement will be imparted to the gear $e^3$, and sufficient end-play will be allowed between the connected shafts I and $g^2$ to provide for the desired outward and inward movement of the sliding table G', to which the standard $G^2$ is attached.

Within the bearing $e^5$, at or near the upper end of the standard $G^2$, is placed the shaft $g^5$, to the outer end of which is attached the gear $h'$, and to the inner end of the same is attached the circular cutting-bed $h^2$, and operative connection is made between the gears $e^3$ upon the end of the shaft $g^2$ and the gear $h'$ upon the end of the shaft $g^5$ by means of the intermediate gear $h^3$.

Upon the inwardly-directed face of the standard $G^2$ is arranged the sliding bar $G^3$, provided with a friction-roller $h^4$, which is loosely held upon the screw-stud $h^5$, and the sliding bar $G^3$ is held in its downward position by means of the oppositely-arranged springs $i^2 i^2$, and is to be raised from its downward position against the resilient action of the said springs by means of the cam-lever $G^4$, which is loosely pivoted upon the shaft $g^5$, and held in proper position upon the said shaft by means of the adjustable collar $i^3$, and between the collar $i^3$ and the circular cutting-bed $h^2$ is placed the sleeve $i^4$.

To the upper end of the sliding bar $G^3$ is attached the curved arm P, to the outer end of which, in the plane of the bed $h^2$, is pivoted the circular cutter $i^5$, which, when the sliding bar is at its lower position, rests with its lower edge in a groove $j^3$ in the periphery of the bed $h^2$, and when supported by the engagement of the notch $j^4$ of the lever $G^4$ with the periphery of the roller $h^4$ the edge of the cutter $i^5$ will be raised out of engagement with the cutting-bed $h^2$, as shown in Fig. 1.

To the upper end of the standard $G^2$ is attached the curved arm P', to the inwardly-directed end of which is attached the frictional smoothing-former $h^6$ for smoothing the head of the cigar.

Within a bearing $m'$ at the opposite sides of the standard C is placed the forwardly-projecting hub $m'$ of the gear $m^2$, which is provided with a longitudinally-directed groove $m^3$, (shown in Fig. 7,) and within the hub of the gear $m^2$ is placed the sliding shaft $m^4$, the said shaft being rotated by means of a pin $m^9$, which enters the groove $m^3$, so as to slide therein. The shaft $m^4$ is also supported by a suitable bearing in the standard C', and to the forward end of the said shaft is attached the flexible spiral wire $m^5$ by means of the coupling $n^3$.

To the sliding table G' are attached the opposite standards Q Q, to which are attached the adjustable bearings Q' Q', which serve to support the shafts $n^4$ of the revolving cones $n^5$, which cones form a portion of the heading devices, the bearing Q' being adjustably attached to the standard Q by means of the screw $m^6$.

Upon the rearward end of the shafts $n^4$ is attached the flexible spiral wire $m^8$, and operative connection is made from the spiral wire $m^5$ to the spiral wire $m^8$ by means of the rod or shaft $o'$. The apexes $o^2$ of the revolving cones $n^5 n^5$ are made to touch each other and to rest in contact with the side of the bed $h^2$ near its periphery, and the smoothing-former $h^6$ is conically hollowed to conform to the hollowed form of the cones $n^5$, so that their conjoint action will produce the desired conoidal head upon the cigar.

To the sliding table G' is also secured the standard R, which serves to support the ironing-plates R' R' at the opposite sides of the machine, the said ironing-plates being thus made to move back and forth with the sliding table, and to the sliding bed G' is also attached the catch-piece $r'$, which engages with the point $r^2$ of the catch-lever S, the said point $r^2$ being held in position for engagement with the notch $r^3$ in the face of the catch-piece $r'$ by means of the spring $r^4$. The catch-lever S is pivoted by means of the screw $r^5$ to a cross-plate S', which is adjustably attached to the upper side of the slide-bar G, so that whenever the sliding table G' is thrown forward the point $r^2$ of the catch-lever S will be thrown from either side, by the action of the spring $r^4$, into engagement with the notch $r^3$, and the sliding table will remain so held until released by the disengagement of the said catch-lever by the operator. The catch-lever S is provided with the opposite arms $s'$ $s'$, by means of which the said lever can be operated for disengagement at either side of the machine.

To the under side of the sliding table G' is attached the stud T, through a perforation in which is loosely placed the screw $s^2$, provided with a nut $s^6$, and between the inner end of the screw $s^2$ and the forward side of the standard $o$ is placed the connecting spiral spring $s^3$, which serves to carry the sliding table G' inwardly against the engaging point of the catch-lever S. The sliding table G' is moved outwardly against the resilience of the spring $s^3$ by means of the adjustable plate U, attached to the pivoted lever L' and provided with the inclined face $s^4$, which, upon the raising of the lever L' by means of the treadle, will strike against the periphery of the roller $s^5$, attached to the under side of the sliding bed G'. The intermediate rolls $d$ $d'$ $d'$ are enlarged from the tuck-rolling portion, so as to properly fit the expanding space between the adjacent cluster-rolls, and are provided at their inner ends with the hollow tip $o^3$.

In an ordinary cigar-wrapping machine the forming-rolls are required to revolve in both directions in order to be able to run on both the right and the left hand wrappers in the same machine; but when running on the left-hand wrapper, which is to be wound over the bunch and away from the ironing-plate, a much poorer class of work will be produced than when running on the right-hand wrappers, which are wound under the bunch directly from the ironing-plate. In our improved machine, as hereinbefore described, both the right and the left hand wrappers can be run in a downward direction under the inclosed bunch direct from the ironing-plate, thus producing a uniform grade of work for both forms of the wrapper.

When the machine is turned to one side upon its pivot-stem $c'$, as shown in Fig. 1, the downwardly-projecting end of the lever $C^5$, by striking against the side of the stop J, will cause a swinging movement of the head $C^4$, thus producing an open space between the adjacent rolls D $d'$ upon that side of the machine which is presented to the operator and closing the space between the corresponding rolls D $d'$ at the opposite side, so that the cigar-wrapper, when first inserted for rolling around the inclosed bunch, cannot run out between the said opposite rolls D $d'$, but will be caused to continue around the bunch and be continuously wound thereon, the wrapper being also prevented from running out between the lower rolls D D by means of the intermediate roll $d$, so that the necessity of pasting the inserted end of the wrapper will be avoided.

When the machine is set in the proper position for running on the right-hand wrappers, as shown in Fig. 1, and it is desired to reverse the side of the machine for the purpose of running on the left-hand wrappers, the end of the machine having the hand-wheel I' is to be brought toward the operator and the machine turned in that direction upon its pivot-stem $c'$ until the lower end of the lever $C^5$ strikes the stop J', thus causing the swinging movement of the upper rolls, so as to automatically reverse the opening for running in the wrapper to conform to the reversed position of the machine, and upon this reversal of the machine the left-hand wrappers can be run in between the presented rolls D $d'$ and passed downward under the cigar-bunch from the ironing-plate, as before.

When the bunch is to be inserted into the rolling pocket formed by the cluster of rolls, a downward pressure upon the treadle will cause the lifting of the lever L' and the resulting angular opening movement of the upper rolls, and upon the lifting of the lever L' the inclined face $s^4$ of the adjustable plate U will strike against the periphery of the roller $s^5$ and cause a slight outward movement of the sliding table G' until the point $r^2$ of the catch-lever S will enter the notch $r^3$ in the catch-piece $r'$, and thus serve to hold the sliding table G' and the attached heading devices and rotary cutter in their forward position until released therefrom by the operator of the machine, and when the sliding table G', which also carries the bearings Q' for the flexible shafts connected with the cones $n^5$ $n^5$, is moved in either direction the movement will be taken up by the sliding joints formed by the hubs of the gears $m^2$ and the sliding shafts $m^4$, so that in whatever position the said cones are placed, either by the forward-and-backward movement of the sliding table G' or the angular adjustment of the bearings Q', the cones $n^5$ will be properly rotated. Upon the proper insertion of a cigar-bunch and the reverse movement of the treadle the rolls will be closed upon the bunch so as to rotate the same, and the sliding table G' and the attached devices will be held, as described, in their forward position until released by the operator. By the proper tilting movement of the cam-lever $G^4$ the roller $h^4$ of the sliding bar $G^3$, which carries the rotary cutter $i^5$, will be released from the engaging notch $j^4$, so that the rotary cutter $i^5$ will be brought into engaging contact with the revolving periphery of the cutting-bed $h^2$ at the groove $j^3$.

When the wrapper has been inserted between the rolls D $d'$ and rolled onto the bunch in the downward direction from the ironing-plate R' and has arrived with its forward edge to the extreme point of the rolling pocket and to contact with the edge of the rotary cutter $i^5$, the wrapper will be drawn obliquely between the edge of the cutter and its cutting-bed until the wrapper has been cut to the proper point for being turned to cover the conoidal head of the cigar, at which time the operator raises the cutter $i^5$ from its cutting-bed $h^2$ and disengages the catch-lever S from the notch $r^3$, so that the heading devices, comprising the cones $n^5$ and smoothing-former $h^6$, will be brought forward by the action of the spring $s^3$, and the properly-cut wrapper will then be wound around the conoidal end and tip of the cigar. The cutter $i^5$ can be lifted from the cutting-bed $h^2$ at the proper time by the required tilting movement of the cam-lever $G^J$, whereby the roller $h^4$ will be again engaged with the notch $j^4$.

The position of the heading devices $n^5$ $n^5$ $h^6$ with reference to the length of the cigar can be changed either by the backward and forward adjustment of the plate U, having the inclined face $s^4$, or of the roller $s^5$; and the rolls D D D' can be adjusted for rolling cigars of different diameters and lengths by the outward and inward movement of the bearing-wires $k$ $k^2$ and the supporting-bridges $p$ $p'$. The cones $n^5$ $n^5$ can be employed without the smoothing-former $h^6$, and an additional cone can be made to take the place of the smoothing-former, if preferred. The gears $m^2$ $m^2$, which serve to operate the cones $n^5$ $n^5$, are driven from the gear $v^4$ upon the shaft I by means of the intermediate gears $v^3$ $v^3$, as shown in Fig. 9.

We claim as our invention—

1. A cigar-wrapping machine provided with a pivot and constructed to be turned end for end upon said pivot as an axis, so that the right-hand wrappers can be run in at one side of the machine and the left-hand wrappers at the turned opposite side, substantially as described.

2. A cigar-wrapping machine provided with a hollow pivot and constructed to be turned end for end upon such pivot as an axis, in combination with power-transmitting means located in said hollow pivot, substantially as described.

3. A cigar-wrapping machine held upon a pivoted support and constructed to be turned end for end upon said pivoted support as an axis and having the opening rolls of the cluster pivoted to have a lateral swinging movement, substantially as and for the purpose specified.

4. A cigar-wrapping machine held upon a pivoted support and constructed to be turned end for end upon said pivoted support as an axis and having the opening rolls of the cluster pivoted to have a lateral swinging movement for opening and closing the cluster on opposite sides, and means for effecting such swinging movement automatically upon the reversal of the machine upon its pivot, substantially as described.

5. In a cigar-wrapping machine composed of a cluster of rolls, the combination of a transversely-pivoted support for the opening-rolls of the cluster, a spring-operated sliding table, heading devices mounted on said table, and connections between the table and the opening-rolls of the cluster for automatically moving the table against the action of the spring upon the opening movement of the roll, substantially as described.

6. The combination, with a cluster of cigar-forming rolls, of a spring-operated sliding table, heading devices mounted on said table, connections between said table and the opening-rolls of the cluster for automatically moving the table against the action of the spring upon the opening movement of the rolls, and a spring-actuated catch adapted to hold the sliding table in its forward position until released by the operator, substantially as described.

7. The combination, with a cluster of cigar-forming rolls and means for driving said rolls, of two or more cones for forming the head and point of a cigar, and means for driving said cones independent of the rolls, substantially as described.

8. The combination, with a cluster of cigar-forming rolls and means for driving said rolls, of two or more positively-driven cones and flexible shafts for revolving said cones, said shafts being independent of the rolls, whereby the cones may be set at different angles, substantially as described.

9. The combination, with a cluster of cigar-forming rolls, of two or more positively-driven cones and a non-rotating friction-former co-operating with said cones to form the head of a cigar, substantially as described.

10. The combination, with a cluster of cigar-forming rolls, of a loosely-mounted rotary cutter and a positively-driven revolving bed co-operating with said cutter, substantially as described.

11. The combination, with a cluster of cigar-forming rolls, of a loosely-mounted rotary cutter and a positively-driven revolving bed co-operating with said cutter, said bed being provided with a groove to receive and engage with the edge of the rotary cutter, substantially as described.

12. The combination, with a cluster of cigar-forming rolls, of a rotary cutter, a positively-driven revolving bed, and a spring for holding said cutter against said bed, said bed being provided with a groove to receive and engage with the edge of the rotary cutter, substantially as described.

13. The combination, with a cluster of cigar-forming rolls, of a rotary cutter, a positively-driven revolving bed, a spring for holding said cutter against said bed, and means, substantially as described, for lifting and holding the cutter away from its revolving bed, substantially as set forth.

14. The combination, with a cluster of cigar-forming rolls, of a series of short flexible rolls adjustably supported at their outer ends and arranged alternately between the main forming-rolls, substantially as described.

15. In a cigar-machine the wrapping devices of which consist of a series of rolls, one or more of which is flexible and spirally formed, the combination, with said flexible roll, of a bridge or outer support for holding the said roll in position, substantially as described.

RICHARD A. BRIGHT.
WALTER A. PECK.

Witnesses:
W. H. THURSTON,
S. SCHOLFIELD.